Feb. 26, 1929.
H. M. JENKINS
TREE SKINNING KNIFE
Filed Sept. 27, 1926
1,703,305
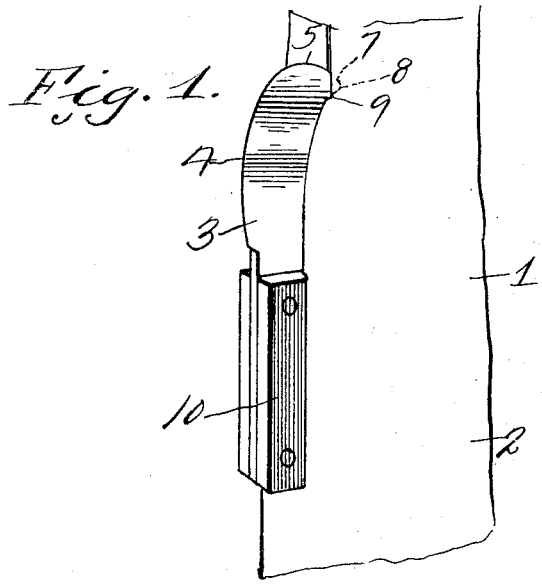
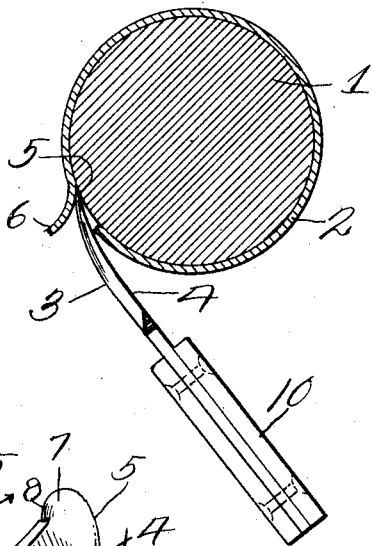
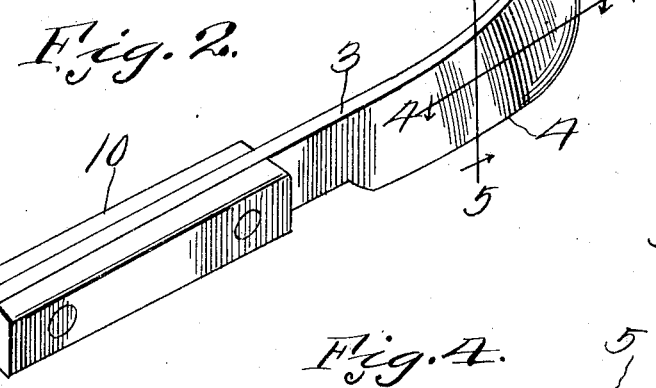
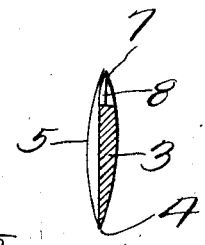
Inventor
H. M. Jenkins
By Philip A. H. Sewell
Attorney Patented Feb. 26, 1929.

1,703,305

UNITED STATES PATENT OFFICE.

HALLET M. JENKINS, OF KALAMA, WASHINGTON.

TREE-SKINNING KNIFE.

Application filed September 27, 1926. Serial No. 138,010.

The invention relates to tree skinning knives and has for its object to provide a knife of this character which is particularly adapted for removing bark from trees which bark is used for medicinal purposes and is commonly known as cascara bark. Where a bark is used for medicinal purposes, it is necessary for the bark to be scraped for removing moss and other foreign matter before the skinning operation, and a straight knife edge is not adapted for this use, therefore it is one of the objects of the invention to provide a skinning knife blade which is longitudinally bowed so that the scraping edge thereof will conform in a great degree to the curvature of the tree, and at the same time provide a knife having on the rear outer end of the blade thereof a sharpened projection which may be forced through the skin of the tree, and when the knife is moved longitudinally, will split the same. Also to provide the outer end of the blade with a curved edge, which curved edge may be inserted under the bark with the concaved side of the longitudinally bowed blade towards the tree for allowing the knife to be utilized for removing the bark circumferentially from the tree.

A further object is to provide the knife with a longitudinally bowed blade for not only allowing the knife edge to be used as a scraper for the convex side of the bar, but for allowing the knife to be easily worked around the tree during the bark removing operation, and with the concave side of the knife towards the tree, thereby allowing the end of the blade to be substantially tangential with the periphery of the tree during the bark removing operation.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the knife showing the same in position for splitting the bark.

Figure 2 is a perspective view of the knife.

Figure 3 is a horizontal sectional view through the tree showing the knife in position for removing the bark.

Figure 4 is a horizontal sectional view through a portion of the knife blade taken on line 4—4 of Figure 2.

Figure 5 is a vertical transverse sectional view through the blade on line 5—5 of Figure 2.

Referring to the drawing, the numeral 1 designates the tree from which the bark 2 is to be removed. At the present time in removing barks from trees, miscellaneous knives are used as well as tools, which are not designed for the particular purpose, consequently the bark removing operation is slow, inefficient and tedious, and to overcome this difficulty the knife hereinafter set forth is primarily designed. The knife is used on trees from which bark is removed for medicinal purposes, for instance cascara bark.

The knife comprises a longitudinally bowed blade 3 having a sharpened edge 4, which being curved allows said edge to be used for scraping the bark 2 while on the tree for removing moss and other foreign matter, and it is obvious by curving the edge 4, said edge will scrape a relatively large surface at each stroke. The curve of the blade also forms another function, and that is, during the bark removing operation, as shown in Figure 3, and at which time the curved sharpened end 5 of the blade is inserted and forced under the edge 6 of the bark with the concaved side of the bowed blade towards the tree, and during which operation it will be noted that the end of the blade is substantially tangentially disposed in relation to the periphery of the tree 1, consequently the bark may be easily dislodged without gouging out portions of the tree, and at the same time by the tangential relation of the blade the removal of the bark may be quickly accomplished. It will be noted that the sharpened curved edge 5 merges into the sharpened edge 4 and to the back of the blade into the sharpened bark splitting projection 7, therefore it will be seen during the skin splitting operation the knife can be moved upwardly and downwardly, and severing edges will be in operation during the movement of the knife in both directions, which materially quickens the bark removing operation. The sharpened projection 7 has its rear side 8 sharpened, and during the bark splitting operation said sharpened edge 8, after the projection 7 has been driven through the bark, splits the bark at 9, as clearly shown in Figure 1 upon a downward movement of the knife, however it is to be understood the projection 7 may be used for splitting the bark circumferentially of the tree if desired. Blade 3 is provided with a handle member 10 which may be of any construction and adapted to be grasped by the operator while manipulating the knife.

From the above it will be seen that a bark removing knife is provided which is provided with bark splitting and removing features which will expedite the removal of bark from trees, may be used for scraping moss from the bark, and being longitudinally bowed allows the bark to be dislodged from the tree circumferentially of the tree without damage to the bark or severing of part of the tree and leaving the same on the bark, which would have to be removed.

It will also be seen that the device is simple in construction and may be cheaply manufactured and sold.

The invention having been set forth what is claimed as new and useful is:—

A bark removing knife comprising a handle member, a blade carried by said handle member, said blade being longitudinally bowed, the end of said blade being curved and sharpened, one edge of said blade being sharpened and merging into the curved end of the blade, an outwardly extending splitting projection carried by the other edge of the blade adjacent its end, a sharpened edge carried by said projection and extending entirely around the same and merging into the curved end of the blade.

In testimony whereof I hereunto affix my signature.

HALLET M. JENKINS.